United States Patent
Yoho (10) Patent No.: US 7,032,367 B1
(45) Date of Patent: Apr. 25, 2006

(54) HOOF BOOT FOR HOOFED ANIMALS AND METHODS OF MAKING SAME

(76) Inventor: Bonnie R. Yoho, P.O. Box 1452, Salem, AR (US) 72576

( * ) Notice: Subject to any disclaimer, the term of this patent is extended or adjusted under 35 U.S.C. 154(b) by 0 days.

(21) Appl. No.: 10/957,458

(22) Filed: Sep. 30, 2004

Related U.S. Application Data (60) Provisional application No. 60/580,043, filed on Jun. 16, 2004.

(51) Int. Cl.
*B68C 5/00* (2006.01)

(52) U.S. Cl. ....................................... 54/82
(58) Field of Classification Search .................... 54/82; 168/1, 2; 119/814, 850; D30/146, 147
See application file for complete search history.

(56) References Cited

U.S. PATENT DOCUMENTS

| | | | |
|---|---|---|---|
| 349,668 A * | 9/1886 | St. John | 168/2 |
| 593,960 A * | 11/1897 | Dorney | 54/82 |
| 609,551 A | 8/1898 | Lang | |
| 719,687 A * | 2/1903 | Nickerson | 168/2 |
| 830,403 A * | 9/1906 | Barclay | 54/82 |
| 840,892 A | 1/1907 | Adam | |
| 3,703,209 A | 11/1972 | Glass | |
| 3,732,929 A | 5/1973 | Glass | |
| 3,794,119 A | 2/1974 | Paiso et al. | |
| 4,174,754 A | 11/1979 | Glass | |
| 4,189,004 A | 2/1980 | Glass | |
| 4,744,422 A | 5/1988 | Dallmer | |
| 5,224,549 A | 7/1993 | Lightner | |
| 5,441,015 A * | 8/1995 | Farley | 54/82 |
| 5,588,288 A | 12/1996 | Origgi et al. | |
| D378,108 S * | 2/1997 | Shippy | D30/146 |
| 5,661,958 A | 9/1997 | Glass et al. | |
| 6,122,901 A * | 9/2000 | Schultz et al. | 54/82 |
| D440,363 S | 4/2001 | Ford | |
| 6,305,328 B1 | 10/2001 | Marquis | |
| 6,651,410 B1 | 11/2003 | Osha et al. | |
| 6,694,713 B1 * | 2/2004 | MacDonald | 54/82 |
| 2004/0065063 A1 | 4/2004 | Osha et al. | |
| 2005/0072128 A1* | 4/2005 | Ruetenik | 54/82 |

* cited by examiner

*Primary Examiner*—Teri Pham Luu
*Assistant Examiner*—Elizabeth Shaw
(74) *Attorney, Agent, or Firm*—Richard L. Marsh (57) ABSTRACT

A hoof boot for the hoof of hoofed animals, the hoof boot comprising a ground engaging sole portion, a hoof bell and a means for retaining the hoof boot to the hoof, the hoof bell generally encircling the hoof, the means for retaining associated with the hoof bell wherein the hoof bell is initially separate from the sole portion, the means for retaining is carried by the sole portion and wherein the hoof bell is affixed to the sole portion by the means for retaining and the hoof bell and the sole portion are made fast to the hoof by the means for retaining.

19 Claims, 3 Drawing Sheets

HOOF BOOT FOR HOOFED ANIMALS AND METHODS OF MAKING SAME

RELATED APPLICATION DATA

This application is a non-provisional application of Applicant's provisional application Ser. No. 60/580,043 filed on 16 Jun. 2004.

BACKGROUND OF THE INVENTION

1. Field of the Invention

This invention relates to a hoof boot for hoofed animals and particularly a secure hoof boot for a horse to replace metal horseshoes.

2. Prior Art Statement

It is known to provide a resilient upper with protruding buckling portions wherein the upper is preferably bonded to a solid ground engaging sole. The ground engaging sole is split from the rear which allows the frog of the horse's hoof to protrude therethrough. This shoe is placed over a regular iron shoe and captures the front calk in a groove while closing against the rear calks thus capturing the ground engaging sole between the calks. The buckling portions are closed around the rear of the horse hoof For instance, see the U.S. Pat. No. 609,551 issued on Aug. 23, 1898, to Ben P. M. Lang or the U.S. Pat. No. 5,588,288 issued on Dec. 31, 1996 to Origgi, et al. The Lang and Origgi, et al., boots must use an iron shoe attached to the hoof for retention of the boot on the hoof, and therefore are not suitable for a bare hoof, nor for use in mud as the boot could easily fill with mud and dislodge or cause discomfort to the hoof. Therefore, there is a need for a hoof boot to replace an iron horse shoe, the hoof boot having means for firmly securing the hoof boot to the horse hoof.

It is also known to provide a hoof boot wherein the inner sole has a rear upwardly extending tongue carrying buckling straps. An outer hoof boot is attached to the inner sole and a rubber outer sole is affixed to the outer hoof boot and inner sole. The upper buckling strap passes through slits in the upper portion of the outer hoof boot and the tongue at or above the bulb of the hoof. The lower buckling strap passes through slits in the lower portion of the tongue & is affixed to the lower portions of the outer hoof boot. For instance, see the U.S. Pat. No. 840,892 issued on Jan. 8, 1907 to Emile Adam. The inner sole and outer boot need to be custom made for each hoof and the rearwardly extending tongue is of sufficient height to rub on the coronet band and engage the fetlock thus causing discomfort to the horse. Thus there is still a need for a hoof boot to replace an iron horse shoe, the hoof boot having means to protect the coronet band and the fetlock.

It is further known to provide a hoof boot which is molded from limited flexibility, strong thermoplastic or thermosetting material such as urethane and has a over center toggle buckle to tighten a cable lacing which passes across the front of the hoof and engages one of a series of hooks on each side wall of the boot. These boots are custom made to each horse as the horse hoof is used as the pattern. In one embodiment, the boot is physically attached to the hoof with penetrating fasteners, while in another embodiment internal cleat plates engage the sidewall of the hoof to retain the boot to the hoof. For instance, see U.S. Pat. Nos. 3,703,209, 3,732,929, 4,174,754 and 4,189,004 issued on Nov. 21, 1972, May 15, 1973, Nov. 20, 1979 and Feb. 19, 1980 respectively, to Neel Glass, the U.S. Pat. No. 5,661,958 issued on Sep. 2, 1997 to Glass, et al., and the U.S. Design patent D440,363 issued on Apr. 10, 2001 to Garrett Ford. The over-center toggle is easily dislodged when the horse steps into cover or loose material higher than the toggle thus resulting in loss of the boot. Therefore, there is a need to retain a hoof boot to the horse hoof which cannot be easily dislodged yet provides a comfortable platform for the bare hoof.

Yet another prior art hoof boot has a flexible covering made from plastic or rubber and has hook fasteners attached to the external sidewalls and to a short tongue extending upwardly from the rear center of the sole. A strap having loop material encircles the bulb of the hoof and has a pocket centrally located therein to capture the bulb. For instance, see the U.S. Pat. No. 3,794,119 issued on Feb. 26, 1974 to Paiso, et al. or the U.S. Pat. No. 5,224,549 issued on Jul. 6, 1993 to Amy Lightner. The hook and loop material used to retain the hoof boot on the hoof opens in the direction of travel and it has been found that the strap ends are easily lifted thus separating the hook and loop material when the horse is in tall cover or loose material. Thus, there is still a need for a hoof boot which has a positive means for retention in order to properly retain the hoof boot on the horse hoof.

Still further known is a hoof boot that comprises a two part shoe which has a ground engaging portion with a front wall and sidewalls for receiving the hoof therebetween. A separate upper cap with an interior and protruding cushion fits over the bulb and is strapped to the lower part with straps which cross behind the bulb and are tightened around the hoof by a rotary key mechanism carried on the front wall of the lower part. The ends of the straps are captured in tensioning loops of the rotary mechanism. For instance, see the U.S. Pat. No. 4,744,422 issued on May 17, 1988 to Helmuth Dallmer. These boots are very costly to manufacture, do not fully protect the horse hoof and have forward protruding hardware which readily catches upon material in the path of the horse which could cause the horse to stumble. Therefore, there is a need for a hoof boot which has a positive means for retention without significant forward protruding hardware, fully protects the horse hoof and is relatively cost-effective, simple to make and easy to install.

Additionally, it is known to provide a comfort management system for equine wherein the sole portion has a front upper attached to the front and part of the sidewall of the sole and also has a back upper attached to the rear and part of the sidewall of the sole. The front upper has a hook or loop portion on its exterior surface that is engaged by a loop or hook portion of tabs forming part of the rear upper. The hoof boot is installed by releasing the back upper from the front upper, opening the front upper, inserting the hoof, closing the front upper around the sides of the hoof and closing the rear upper around the rear and sides of the hoof with the hook and loop fasteners. At least one of the uppers is made of stretchable neoprene cushioning foam material. Alternate embodiments describe a zipper closure, hook and loop at the front juncture and an adjustable belt. For instance, see the U.S. Pat. No. 6,651,410 B2 issued on Nov. 25, 2003 to OSHA, et al. and the U.S. publication 2004/0065063 A1 published on Apr. 8, 2004. It has been found that the boots in these documents easily dislodge from the hoof yet are difficult to install. It is apparent therefore that a hoof boot which has a positive means for retention still is needed.

Also known is a hoof shoe which has an air cushion bulb engaging inner bladder wherein the hoof shoe is buckled to the hoof and the bladder inflated to firmly tighten the hoof shoe to the hoof. For instance, see the U.S. Pat. No. 6,305,328 B1 issued on Oct. 23, 2001 to Helmut Marquis. Since the bladder fill valve extends from the side of the hoof boot, it is readily apparent that the air could easily be released from the bladder in the normal course of walking and thus the shoe would be easily dislodged from the hoof. Furthermore, the hoof shoe cannot be removed and reinstalled absent a source of compressed air and therefore cannot be used on trail rides. Therefore, a need exists for a hoof boot that replaces an iron horse shoe, is readily applied to the hoof without the use of tools, is readily removable therefrom and provides comfort to the hoof.

Finally, it is known to provide a hoof shoe having a sole portion first attached to the hoof with a band fixed to the heel portion of the sole, the band then passed around the ankle above the coronet band through a second band extending downward to the toe portion of the sole. The bands have hook and loop fasteners thus allowing the bands to be secured upon themselves. A compressive cover is secured around the hoof area engaging hook elements extending upwardly from the side edges of the sole. The compressive cover is closed upon itself with hook and loop fasteners on the opposed ends thereof and further secured with belt elements affixed to the frontal portion of the compressive cover. For instance, see the U.S. Pat. No. 6,694,713 B1 issued on Feb. 24, 2004 to David MacDonald. These boots are commercially available form Old Mac's Corporation, Pty, Ltd. in West Footscray, Australia. It has been found, however, that the securing bands rub the ankle causing great discomfort to the hoof. Additionally, the coronet bell tends to come loose from the remainder of the boot as the hook and loop fasteners do not hold coronet bell firmly to the sole portion. Therefore, there is still a need for an economical hoof boot which has a positive means for retaining a coronet bell to the sole portion and thus retain the entire structure to the hoof.

SUMMARY OF THE INVENTION

The prior art described above contains a plethora of hoof boots for hoofed animals, however, it has been found by the inventor hereof that there are numerous problems with the prior art boots. These problems include: an inability to be properly retained on the hoof, difficulty with installation or require tools for installation, boots are not sufficiently durable or cause damage to the hoof, coronet band, pastern area or the heel bulb of the hoof. Thus, there is a great need for a boot that will overcome the prior art problems. Therefore, it is an object of this invention to provide a comfort boot for the hoof of hoofed animals comprising a sole portion, a boot bell portion and means for retaining the sole and the boot bell upon a hoof of the hoofed animal wherein the sole portion further comprises an inwardly inclined toe wall, substantially upright right and left walls and substantially upright right and left heel wall tabs. The walls extend upwardly from an inside surface of an outer periphery of the sole portion wherein the boot bell portion has a lower peripheral edge thereof disposed inwardly of the wall of the sole portion, the means for retaining comprising means for anchoring associated with the right and left heel wall tabs, means for removably affixing associated with the right and left toe wall tabs, means for capturing associated with the right and left sidewalls and separate left and right retaining straps, the left retaining strap having one end thereof attached to the right heel tab, the left retaining strap passing through the left sidewall loop, through the means for removably affixing associated with the right toe wall tab, again through the left sidewall loop, the left retaining strap having a free end releasably affixed to the left retaining strap adjacent the right heel wall tab, and wherein the right retaining strap having one end thereof attached to the left heel tab, the right retaining strap passing through the right sidewall loop, through the means for removably affixing associated with the left toe wall tab, again through the right sidewall loop, the right retaining strap having a free end thereof releasably affixed to the right retaining strap adjacent the left heel wall tab.

An object of this invention is to provide a comfort boot for an hoofed animal to protect the hoof of the animal, provide protection from concussion upon hard surfaces and to protect the hoof from sharp object such as rocks while still allowing the animal to have all benefits of being barefoot.

One aim of this invention is to provide a removable horse hoof boot to be used in the place of horse shoes.

Another aim of this invention is to provide a removable horse hoof boot to be used for placement of medicaments or comfortable surfaces on the underside of the hoof and retain same in place for the treatment of founder, navicular and hoof abscesses.

Still another object of this invention is to provide a hoof boot for the hoof of hoofed animals comprising a ground engaging sole portion, a hoof bell and a means for retaining the hoof boot to the hoof, the hoof bell generally encircling the hoof, the means for retaining associated with the hoof bell wherein the hoof bell is initially separate from the sole portion, the means for retaining is carried by the sole portion and wherein the hoof bell is affixed to the sole portion by the means for retaining and the hoof bell and the sole portion are made fast to the hoof by the means for retaining.

It is yet another object of this invention to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps.

A further aim of this invention is to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps, the means for retaining comprising a means for anchoring that is associated with right and left heel wall tabs of the sole portion, the means for anchoring anchoring an end of the right and left retaining straps of the means for retaining to the sole portion.

Another goal of this invention is to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps, the means for retaining further comprising a means for doubling which is associated with right and left toe anchoring tabs carried by the sole portion, the means for doubling returning the right and left retaining straps toward the means for anchoring.

A feature of this invention is to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps, the means for capturing associated with right and left side bell grips of the sole portion, the means for capturing capturing the left and right retaining straps therein.

A significant intent of this invention is to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps, the sole portion having right and left heel wall tabs, right and left walls and a toe wall, the wall tabs and the walls extending upwardly from an inside surface of the sole portion, the wall tabs and the walls carrying the means for retaining, the right heel wall tab having an anchoring end of a right retaining strap anchored thereto, the left heel wall tab having an anchoring end of a left retaining strap anchored thereto, the right retaining strap and the left retaining strap engaging an outside surface of the hoof bell to assist in retaining the hoof bell to the hoof.

It is yet another intent of this invention to provide a hoof boot for the hoof of hoofed animals comprising a ground engaging sole portion, a hoof bell and a means for retaining the hoof boot to the hoof wherein the means for retaining comprises a means for anchoring, a means for doubling, a means for capturing and right and left retaining straps, the toe wall having a toe bell grip and left and right anchoring tabs affixed thereto, the toe bell grip engaging an outside surface of the hoof bell to retain the hoof bell to the sole portion of the hoof boot and assist in retaining the hoof bell to the hoot the right anchoring tab comprising a closed loop and carrying a D-ring therein, the left anchoring tab comprising a closed loop and carrying a D-ring therein, the D-rings receiving the retaining straps therethrough and returning the retaining straps toward the right and left heel wall anchoring tabs to retain the hoof bell to the hoof.

Yet another goal of this invention is to provide a hoof boot for the hoof of hoofed animals, the hoof boot comprising a ground engaging sole portion, a hoof bell and a means for retaining the hoof boot to the hoof, the hoof bell generally encircling the hoof, the means for retaining associated with the hoof bell wherein the hoof bell is initially separate from the sole portion, the means for retaining is carried by the sole portion and wherein the hoof bell is affixed to the sole portion by the means for retaining and the hoof bell and the sole portion are made fast to the hoof by the means for retaining and wherein the sole portion has right and left heel wall anchoring tabs, right and left walls and a toe wall, the wall anchoring tabs and the walls extending upwardly from an inside surface of the sole portion, the wall anchoring tabs and the walls carrying the means for retaining wherein the right wall has a right side bell grip affixed thereto, the left wall has a left side bell grip affixed thereto, the right side bell grip and the left side bell grip engaging an outside surface of the hoof bell to retain the hoof bell to the sole portion of the hoof boot and assist in retaining the hoof bell to the hoof.

Yet another goal of this invention is to provide a hoof boot for the hoof of hoofed animals, the hoof boot comprising a ground engaging sole portion, a hoof bell and a means for retaining the hoof boot to the hoof, the hoof bell generally encircling the hoof, the means for retaining associated with the hoof bell wherein the hoof bell is initially separate from the sole portion, the means for retaining is carried by the sole portion and wherein the hoof bell is affixed to the sole portion by the means for retaining and the hoof bell and the sole portion are made fast to the hoof by the means for retaining and wherein the means for retaining comprises at least one heel tab, at least one toe wall and at least two retaining straps associated with the heel tabs and the toe wall, the retaining straps having anchoring ends thereof anchored to at least one heel tab.

A salient feature of this invention is to provide a hoof boot for the hoof of hoofed animals, the hoof boot comprising a ground engaging sole portion, a hoof bell and a means for retaining the hoof boot to the hoof wherein the means for retaining comprises at least one toe wall, the toe wall having left and right anchoring tabs rigidly affixed thereto, the anchoring tabs carrying separate D-rings for receiving the retaining straps therethrough and returning a free end of retaining straps toward the anchoring tabs and wherein the retaining straps have hooks of a hook and loop fastening system provided on at least one side thereof and the hoof bell has loops of the hook and loop fastening system on an outside surface thereof, the hooks of the retaining straps engaging the loops of the hoof bell to retain the hoof bell in fixed relationship to the sole portion.

Yet another object of this invention is to provide a hoof boot for the hoof of hoofed animals, the hoof boot comprising a ground engaging sole portion, a hoof bell and a means for retaining the hoof boot to the hoof, the means for retaining comprising in part at least two retaining straps wherein the retaining straps have hooks of a hook and loop fastening system provided on an outside surface of the anchoring end thereof and loops of a hook and loop fastening system on the outside surface of a free end opposite the anchoring end, the loops on the free end engaged by the hooks on the anchoring end when the free end is returned to the anchoring end.

DESCRIPTION OF THE PREFERRED EMBODIMENTS

While the various features of this invention are hereinafter described and illustrated as a riding hoof boot comprising a sole portion, a boot bell portion and means for retaining the sole and the boot bell upon a hoof of an animal, it is to be understood that the various features of this invention can be used singly or in various combinations thereof hoof boot as can hereinafter be appreciated from a reading of the following description.

Figure 1:
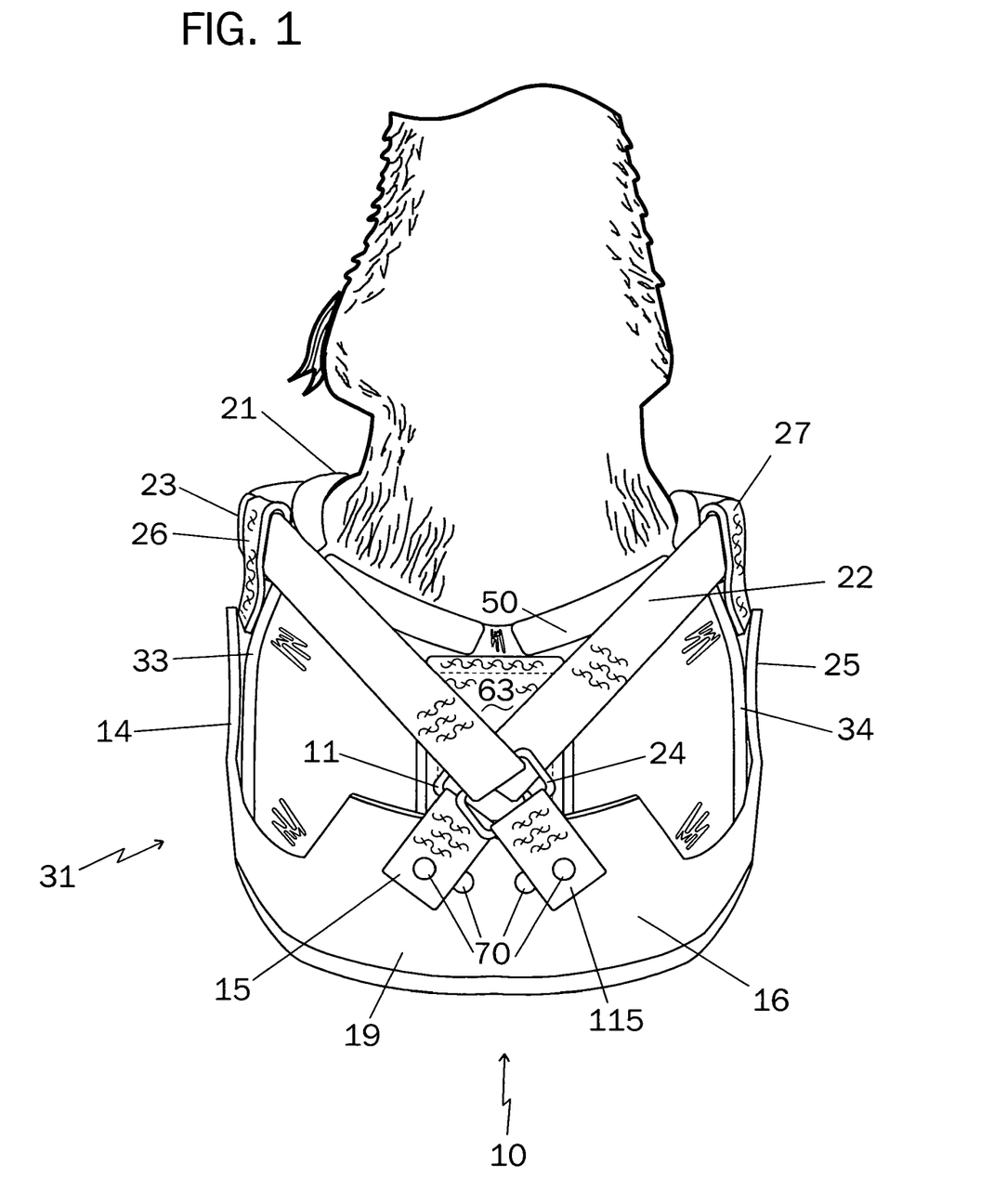
FIG. 1 is a perspective view of the hoof boot of this invention secured onto the hoof of a horse wherein the lower portion of the leg of the horse above the hoof boot is shown.
Figure 2:
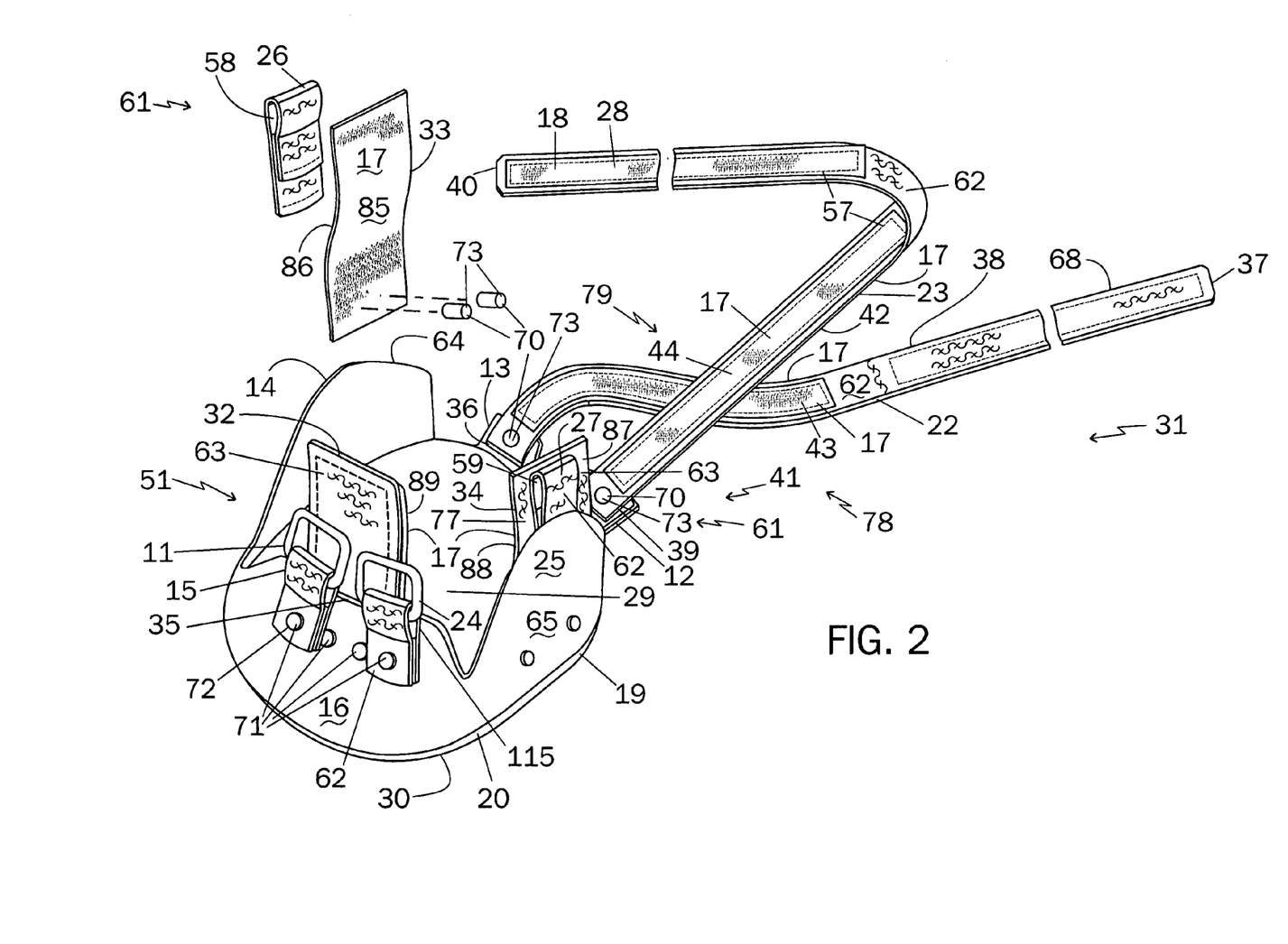
FIG. 2 is a perspective view of the preferred embodiment of the sole portion of the hoof boot of FIG. 1 showing means for retaining the sole portion around the hoof bell of FIG. 3 and the hoof of a horse.
Figure 3:
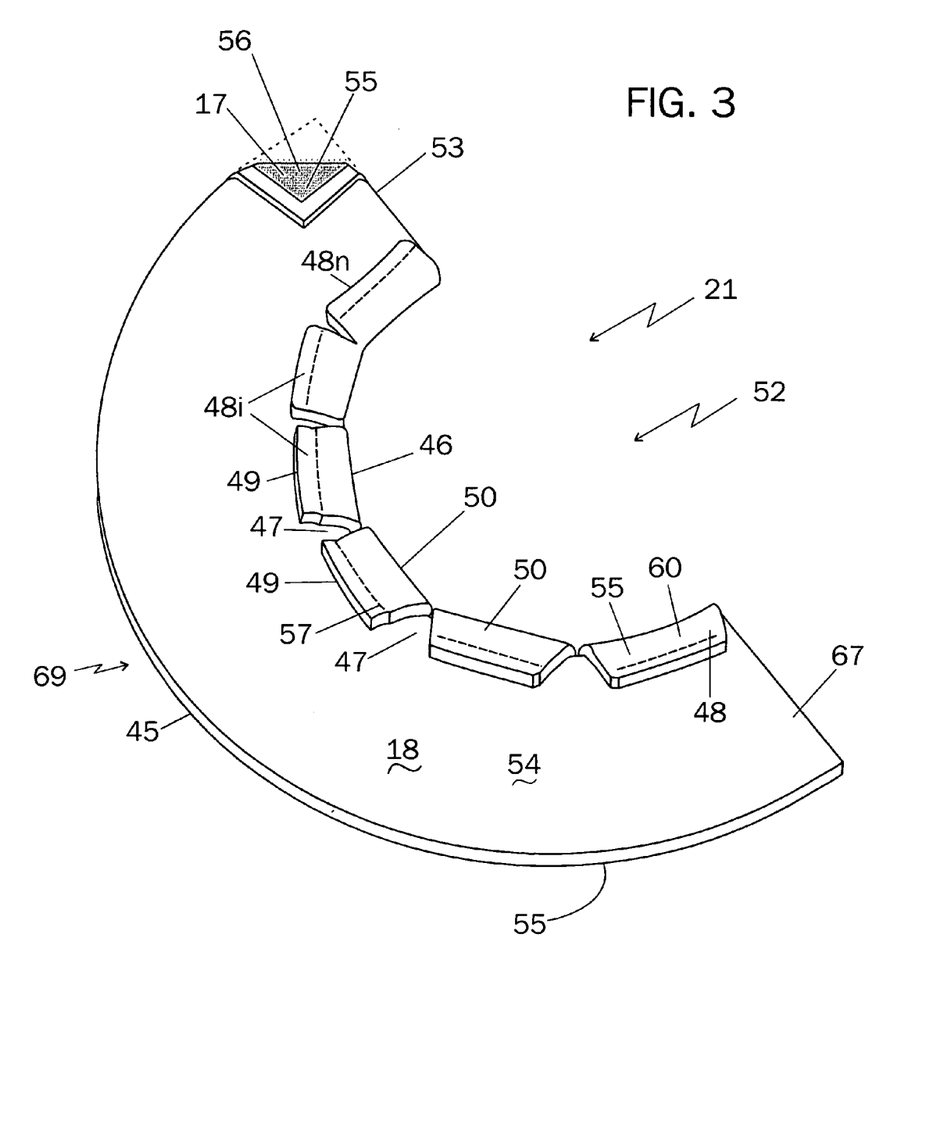
FIG. 3 is an enlarged plan view of the hoof bell of the preferred embodiment of FIG. 1 with one corner of one end folded over to show the underside surface of the hoof bell.

Referring now to FIGS. 1–3, the preferred embodiment of a hoof boot 10 for hoofed animals comprises a sole portion 19, a hoof bell 21 and means 31 for retaining sole portion 19 and hoof bell 21 upon a hoof of a hoofed animal. The hoof, part of the pastern and the coronet band of the animal are largely hidden in FIG. 1, however, a portion of the pastern and fetlock along with the lower portion of the leg of the animal are shown in phantom for reference. Sole portion 19 further comprises an inwardly inclined toe wall 16, substantially upright right and left sidewalls 14, 25, substantially upright right heel anchoring tab 13 and left heel anchoring tab 12. Inwardly inclined toe wall 16 carries a pair of right and left anchoring tabs 15, 115, respectively, right and left anchoring tabs 15, 115 protruding further inwardly and upwardly above a top peripheral edge 35 of toe wall 16. Upright right and left sidewalls 14, 25 carry side bell grips 33, 34 respectively, side bell grips 33, 34 having right side loop 26 and left side loop 27, respectively, firmly affixed to outer surfaces 86, 87 respectively, side bell grips 33, 34 extending upwardly above upper peripheral edge 35. Means 31 for retaining comprises a means 41 for anchoring associated with left and right heel anchoring tabs 12, 13, a means 51 for doubling associated with right and left anchoring tabs 15, 115, a means 61 for capturing associated with right and left side bell grips 33, 34 and separate right and left retaining straps 22, 23. Right retaining strap 22 has anchoring end 36 thereof attached to right heel anchoring tab 13, right retaining strap 22 passing through left side loop 27, through means 51 for doubling associated with right anchoring tab 15, again through left side loop 27, right retaining strap 22 having a free end 37 releasably affixed to the exposed hook section 17 applied to exposed surface 38 of right retaining strap 22, free end 37 lying adjacent right heel anchoring tab 13. In like manner, left retaining strap 23 has anchoring end 39 thereof attached to left heel anchoring tab 12, left retaining strap 23 passing through right side loop 26, through means for doubling 51 associated with left anchoring tab 115, again through right side loop 26, left retaining strap 23 having a free end 40 thereof releasably affixed to the exposed hook section 17 applied to exposed surface 42 of left retaining strap 23, free end 40 lying adjacent left heel anchoring tab 12. Both surfaces 38, 43 of right retaining strap 22 have hook section 17 applied to anchoring section 78 thereof as do both side surfaces 42, 44 of anchoring section 79 of left retaining strap 23, the purpose to be fully explained hereinafter. Sections 78, 79 of inner surfaces 43 and 44 extend along retaining straps 22, 23 a distance sufficient to engage outside surface 54 of hoof bell 21 to retain hoof bell 21 to the hoof of the animal while hook section 17 of exposed surfaces 38, 42 extends only along retaining straps 22, 23 enough to receive and retain free ends 37, 40 respectively. In the preferred embodiment, hoof boot 10 comprises sole portion 19 having a thick textured sole plate 20 preferably molded as an integral unit from an elastomer selected from the group comprising natural rubber, polyisoprene, polyurethane, styrene-butadiene rubber, butyl, silicone, vinyl or blends of the above, sole portion 19 having a toe wall 16, a right upright sidewall 14, a left upright sidewall 25 and heel anchoring tabs 12, 13 extending upwardly from the sole portion 19. Thick textured sole plate 20 preferably has a tread on the underside surface 30 thereof and may additionally have a sculpted pattern upon inner sole surface 29. Heel anchoring tabs 12–13 and walls 14, 16, 25 provide anchors for components of means 31 for retaining sole portion 19 to, and capturing hoof bell 21 around a horses' hoof as will hereinafter be fully explained.

In a minimum configuration of the preferred embodiment, hoof boot 10 for the hoof of hoofed animal comprises at least ground engaging sole portion 19, hoof bell 21 and a means 31 for retaining hoof boot 10 to the hoof wherein hoof bell 21 generally encircles the hoof and means 31 for retaining is associated with hoof bell 21. Preferably, hoof bell 21 is initially separate from sole portion 19 and means 31 for retaining is carried by sole portion 19 wherein hoof bell 21 is affixed to sole portion 19 by means 31 for retaining, hoof bell 21 and sole portion 19 also made fast to the hoof by means 31 for retaining. Means 31 for retaining comprises at least one heel anchoring tab 12, 13, toe wall 16 and at least two retaining straps 22, 23 associated with heel anchoring tabs 12, 13 and toe wall 16 wherein retaining straps 22, 23 have anchoring ends 36, 39 respectively thereof anchored to at least one heel anchoring tab 12, 13. In the drawings, heel anchoring tabs 12, 13 are shown as separate tabs, however, it is fully within the scope of this invention to provide only a single heel anchoring tab 12 or 13 for anchoring retaining straps 22, 23. Toe wall 16 has right and left anchoring tabs 15, 115 rigidly affixed thereto, anchoring tabs 15, 115 carrying separate D-rings 11, 24 for receiving retaining straps 22, 23 therethrough and returning free ends 37, 40 of retaining straps 22, 23 toward heel anchoring tabs 12, 13. Retaining straps 22, 23 have hook sections 17 of a hook and loop fastening system provided on at least one surface 38, 42–44 thereof and hoof bell 21 has loop sections 18 of a hook and loop fastening system on an outside surface 54 thereof, hooks of hook sections 17 of retaining straps 22, 23 engaging loops of loop sections 18 of outside surface 54 of hoof bell 21 thus retaining hoof bell 21 in fixed relationship to sole portion 19. Additionally, retaining straps 22, 23 also have hook sections 17 of a hook and loop fastening system provided on exposed surface 38, 42 of anchoring ends 36, 39 respectively thereof and has loop sections 18 of a hook and loop fastening system on end sections 68, 28 of free ends 37, 40 opposite anchoring ends 36, 39, loops of loop sections 18 on free ends 37, 40 engaged by hooks of hook sections 17 on anchoring end 36, 39 respectively when free ends 37, 40 are returned to anchoring ends 36, 39.

Referring specifically to FIG. 3, hoof bell 21 has UBL loop sections 18, of a hook and loop fastening system, as an outside surface 54 and a non-abrasive material such as sponge rubber, nylon fabric, or alternately, UBL sections 18 on at least a major portion of an inside surface 55. The non-abrasive material protects the pastern, coronet band and heel bulb of the horses' hoof from rubbing by retaining straps 22, 23 as retaining straps 22, 23 are disposed against outside surface 54 of hoof bell 21 in direct contrast to the prior art boots cited above and especially as shown in the aforementioned U.S. Pat. No. 6,694,713 wherein it is clear that the securing belts for the sole are passed over and secured around the coronet band. Irritation of the coronet band is prevalent when a securing belt is placed adjacent thereof or thereagainst as the securing belt has a tendency to ride upwardly along the angled wall of the hoof directly into the coronet band. Thus, it is readily apparent that retaining straps 22, 23 of the instant invention cannot ride upwardly along the angled hoof wall as each retaining strap 22, 23 is fixed in relationship to sole portion 19 at at least two anchoring points along the arcuate path around the hoof described by retaining straps 22, 23 and hoof bell 21 is held in firm engagement with the hoof by retaining straps 22, 23 as hook sections 17 of free ends 37, 40 of retaining straps 22, 23 engage loop sections 18 of outside surface 54 of hoof bell 21 when hoof boot 10 is fully installed upon a hoof.

However, it will also become readily apparent that additional securing of hoof bell 21 to sole portion 19 is provided as sidewalls 14, 25 of sole portion 19 have side bell grips 33, 34, respectively, anchored thereto, side bell grips 33, 34 having hook sections 17 of a hook and loop fastening system disposed on inside surfaces 85, 88 thereof wherein hooks of hook sections 17 engage outside surface 54 of hoof bell 21 to further assist in fixing hoof bell 21 to sole portion 19. Additionally, side bell grips 33, 34 have loops 26, 27 of heavy nylon webbing material 62, respectively, affixed to outer surfaces 86, 87 thereof, side loops 26, 27 receiving retaining straps 22, 23 therethrough when installing hoof boot 10 on a hoof. Though other means of attaching are possible within the scope of this invention, it is preferred that retaining straps 22, 23 are anchored to heel anchoring tabs 12, 13, side bell grips 33, 34 are anchored to sidewalls 14, 25, toe bell grip 32 is anchored to toe wall 16 and anchoring tabs 15, 115 are anchored to toe wall 16 with anchoring rivets 70.

Hoof bell 21 is shaped as a crescent 52 when laid out flat and is also unique in the preferred embodiment shown in FIG. 3 as the upper peripheral edge 49 of the upper end 46 thereof is segmented at slits 47 wherein each segment 48–48n thus produced is rolled outwardly and secured to hoof bell 21 adjacent upper peripheral edge 49. Upper end 46 thus has non-abrasive material of inside surface 55 exposed on segments 48–48n and therefore comprises a smooth, rounded surface 50 which cannot irritate the pastern, heel bulb or coronet band. Smooth, rounded surface 50, when hoof boot 10 is fully installed upon a horse's hoof, actually forms around the coronet band and loosely engages therewith thus keeping debris from working downwardly inside hoof bell 21 thus preventing dislodging of hoof boot 10 from the horse's hoof. Crescent 52 of hoof bell 21 is greater in length than the outside surface length of the hoof and has hook sections 17 of a hook and loop fastening system applied to a portion 56 of inside surface 55 of one end 53 of crescent 52, hook sections 17 engaging UBL sections 18 on outside surface 54 when hoof bell 21 is tightly wrapped about a horse's hoof at initial installation of hoof boot 10. Of course, once hoof boot 10 has been fitted to a particular horses' hoof, end 53 may be opened to remove or reinstll hoof boot 10 without disturbing the relationship between hoof bell 21 and other anchoring components associated with sole portion 19 as will become readily apparent hereinafter.

Hoof bell 21 is retained in place over the horse's hoof by holding hoof bell 21 in fixed relationship to sole portion 19 with right side bell grip 33, left side bell grip 34 and toe bell grip 32, side bell grips 33, 34 and toe bell grip 32 comprising laminated heavy nylon webbing material 63 and hook section 17 of a hook and loop fastener system, hook section 17 covering a major portion of the inside surfaces 85, 88, and 89, respectively as can be observed on inside surface 85 of right side bell grip 33 in FIG. 2. Hook section 17 of side bell grips 33, 34 and toe bell grip 32 engage outside surface 54 of hoof bell 21 when sole portion 19 is engaged with the hoof of the animal, side bell grips 33, 34 and toe bell grip 32 folded inwardly toward hoof bell 21 after engagement and seating of the hoof upon inner sole surface 29. Although a fixed relationship of hoof bell 21 to sole portion 19 is established by engaging hook sections 17 of bell grips 32–34 with outside surface 54, hoof bell 21 is held in the fixed relationship by right and left retaining straps 22, 23 as right and left retaining straps 22, 23 are rigidly fastened to left and right heel anchoring tabs 12, 13, respectively, removingly engaged through right and left side loops 26, 27, respectively, removingly engaged through right and left D-rings 11, 24 respectively of right and left anchoring tabs 15, 115, respectively, further removingly engaged through right and left side loops 26, 27, respectively, having free ends 37, 40 respectively removingly engaged adjacent anchoring ends 36, 39 respectively.

Right and left retaining straps 22, 23 comprise laminated narrow nylon webbing material 62, loop section 18 and hook sections 17 of a hook and loop fastener system, hook section 17 covering at least ten percent of both inner surfaces 43, 44 and exposed surfaces 38, 42, respectively, hook sections 17 observed on inner surfaces 43, 44 in FIG. 2. Preferably, hook section 17 on inner surfaces 43, 44 extends approximately 50 percent of the length of retaining straps 22, 23 such that outside surface 54 of hoof bell 21, outer surfaces 86, 87 of right and left side bell grips 33, 34 respectively and inside surfaces 58, 59 respectively of right and left side loops 26, 27 are fully engaged when retaining straps 22, 23 are wrapped therearound and threaded therethrough in the initial steps of securing sole portion 19 and hoof bell 21 to the hoof Of course, hook section 17 may cover a lesser portion of inner surfaces 43, 44 such that hook section 17 only engages portions of hoof bell 21 between heel anchoring tabs 12, 13 and side bell grips 33, 34 and portions of hoof bell 21 between side bell grips 33, 34 and D-rings 11, 24 thus freely running through side loops 26, 27, however, for ease of manufacture, hook section 17 is preferred to extend about half the distance of retaining straps 22, 23 as recited above. Exposed surfaces 38, 42, respectively, of retaining straps 22, 23 have hook section 17 firmly attached to about half the length of narrow nylon webbing material 62, hook section 17 disposed on exposed surfaces 38, 42 directly opposite hook sections 17 on inner surfaces 43, 44 hook sections 17 extending inwardly from anchoring ends 36, 39 while free ends 37, 40 have UBL loop pile sections 18 disposed on exposed surfaces 38, 42. As exposed surfaces 38, 42 have UBL loop pile sections 18 adjacent free ends 37, 40 along approximately half the length of retaining straps 22, 23, hook section 17 of the respective retaining strap 22, 23 may be secured thereto to close retaining straps 22, 23 adjacent anchoring ends 36, 39 respectively. Since free ends 37, 40 are passed through side loops 26, 27 at mounting of hoof boot 10 to the hoof and are secured to anchoring ends 36, 39, retaining straps 22, 23 securely hold hoof bell 21 against the hoof as well as hold sole portion 19 to the hoof thus overcoming the common shortcoming of prior art boots of dislodging the boot in loose material or heavy cover.

Side bell grips 33, 34 and toe bell grip 32 are generally rectangular pieces of heavy nylon webbing material 63 having hook sections 17 firmly secured to inside surfaces 85, 88 and 89 thereof, respectively. Centrally disposed on opposite outer surface 86 of side bell grip 33 is right side loop 26, right side loop 26 comprising a doubled over elongated piece of heavy nylon webbing material 62, right side loop 26 anchored to right side bell grip 33 with at least one anchoring rivet 70 passing through side bell grip 33, both ends of right side loop 26 and right sidewall 14, anchoring rivet 70 headed over against external surface 64 of right sidewall 14. In like manner, left side loop 27 comprises doubled over heavy nylon webbing material 62 and is securely fastened to left sidewall 25 by at least one anchoring rivet 70 passing first through left side bell grip 34, through both ends of left side loop 27 and left sidewall 25, anchoring rivet 70 headed over against external surface 65 of left sidewall 25. Side bell grips 33, 34 preferably have additional anchoring rivets 70 disposed therethrough and through right and left sidewall 14, 25 respectively, as shown in FIGS. 1 and 2 wherein anchoring rivets 70 are also headed over against external surfaces 64, 65. Alternately, side loops 26, 27 may have one end first sewn to side bell grips 33, 34 respectively, having the opposite end folded over the first end and secured to side bell grips 33, 34 at a position below the first end. Side bell grips 33, 34 have exposed heavy nylon webbing material 63 on outer surfaces 86, 87 respectively, heavy nylon webbing material 63 engaged by hooks of hook section 17 of retaining straps 22, 23 respectively when retaining straps 22, 23 are passed through side loops 26, 27 as the exposed heavy nylon webbing material 63 is readily gripped by hooks of hook section 17. Thus, there is no need for UBL loop pile sections 18 to be secured to outer surfaces 86, 87 or to side loops 26, 27 in order for these components to be held rigidly by retaining straps 22, 23. Alternately, side loops 26, 27 may be rigidly secured to side bell grips 33, 34 respectively by stitching both ends of side loops 26, 27 to outer surfaces 86, 87 and it should be understood that other means of securing side loops 26, 27 to outer surfaces 86, 87 may be employed as are well known in the art. In fact, it is within the scope of this invention to form side loops 26, 27 from side bell grips 33, 34 by cutting away portions of side bell grips 33, 34 adjacent side loops 26, 27, folding over side loops 26, 27 and securing the free end thereof to side bell grips 33, 34. Anchoring tabs 15, 115 comprise lengths of narrow heavy nylon webbing material 62 which are doubled over and secured to toe wall 16 with at least one anchoring rivet 70 passing through toe wall 16 and both ends of the respective anchoring tab 15, 115, anchoring rivet 70 peened over against a heading washer 71 placed over the peening end 72 of anchoring rivet 70. Anchoring rivets 70 preferably have the flat, smooth head 73 thereof generally disposed inwardly of components 15, 22, 23, 32–34 and 115 to be anchored to sole portion 19 with peening end 72 then disposed outwardly of heel anchoring tabs 12, 13, walls 14, 16 and 25 thus removing any source of abrasion from the region of the hoof. Furthermore, hoof bell 21 has lower peripheral edge 45 thereof disposed inwardly of inwardly inclined toe wall 16, upright sidewall 14, 25 and heel wall anchoring tabs 12, 13 of sole portion 19, hoof bell 21 providing further protection from abrasion as the soft sponge of hoof bell 21 lies between the hoof and any elevated component of hoof boot 10. Finally, it should be readily apparent that the compressive nature of hoof bell 21 constantly keeps hoof boot 10 in fixed relationship to the hoof as the dynamic forces generated in the components 11–16, 22–27, 32–34, 115 are absorbed in the soft sponge of hoof bell 21 as hoof bell 21 is fully disposed between components 11–16, 22–27, 32–34, 115 and only inner sole surface 29 of sole portion 19 and inside surface 55 of hoof bell 21 are fully in engagement with the hoof, again in contrast to the prior art boots wherein the bell, when used, is disposed outwardly of at least a portion of the securing belts.

As hook and loop fastening is used for components 22–23 and 32–34 of hoof boot 10, each component 22–23 and 32–34 is repositionable in proper turn to ensure that hoof boot 10 fully engages the hoof of the animal on which hoof boot 10 is placed. Therefore, it is readily apparent that hoof boot 10 is also adjustable within a certain range and thus can be fitted to a hoof of slightly different size by repositioning and tightening components 22–23 and 32–34 against the selected hoof. Furthermore, a hoof may be trimmed slightly to fit one of three or four sizes needed to cover the entire range of hoof sizes. Additionally, it should also be readily apparent that hoof boot 10 is retightenable against the hoof on which hoof boot 10 was originally placed for use upon a changed surface condition such as mud, sand or hard ground.

Hoof bell 21 is first wrapped around the hoof of the animal with smooth, rounded surface 50 of upper end 46 substantially covering the coronet band of the hoof with lower peripheral edge 45 fully in circling the hoof at or above the sole of the hoof. Hoof bell 21 is secured to itself around the hoof by overlapping end 53 over end 67 wherein hook sections 17 on portion 56 of inside surface 55 of end 53 engage the fabric of outside surface 54. While holding toe bell grip 32 and side bell grips 33, 34 outwardly, the sole of the hoof is then inserted into sole portion 19 under toe bell grip 32 seating the sole of the hoof upon inner sole surface 29. Toe bell grip 32 is then laid inwardly toward hoof bell 21 thus engaging hooks of hook section 17 on the inside surface 89 of toe bell grip 32 with outside surface 54 of hoof bell 21. In like manner, side bell grips 33, 34 are laid inwardly against hoof bell 21 engaging the hooks of hook section 17 on inside surfaces 85, 88 thereof against outside surface 54 of hoof bell 21 therefore fixing the relationship between hoof bell 21 and sole portion 19. It has been found as described above, however, that use of hook and loop fasteners only to retain a boot upon a hoof as described in U.S. Pat. Nos. 3,794,119, 5,224,549 and 6,651,410 is inadequate. Therefore, hoof boot 10, comprising hoof bell 21, sole portion 19 and means 31 for retaining carried upon sole portion 19, is then fixed in relationship to the hoof by first leading right retaining strap 22 toward left side bell grip 34, feeding free end 37 through left side loop 27 engaging some of the hooks of hook sections 17 on inner surface 43 against hoof bell 21 in the area between left heel anchoring tab 12 and left side bell grip 34 and outer surface 87 of left side bell grip 34. Right retaining strap 22 is then passed through right D-ring 11 and some of the hooks of hook sections 17 on inner surface 43 are engaged with forward outer surface 77 of left side bell grip 34 and the exposed portion of outside surface 54 of hoof bell 21 between left side bell grip 34 and toe bell grip 32 thus providing additional anchoring of hoof bell 21 to sole portion 19. Free end 37 of right retaining strap 22 is then drawn tightly through D-ring 11 and laid backwardly along the same path between D-ring 11 and left side bell grip 34 passing free end 37 again through left side loop 27 engaging hooks of hook sections 17 on exposed surface 38 of right retaining strap 22 with the fabric on end section 68 of exposed surface 38. Left retaining strap 23 is wrapped about the hoof in a similar manner by leading left retaining strap 23 over right retaining strap 22 and toward right side bell grip 33, feeding free end 40 through right side loop 26 engaging some of the hooks of hook sections 17 on inner surface 44 and against hoof bell 21 in the area between left heel anchoring tab 12 and right side bell grip 33 and outer surface 86 of right side bell grip 33. Left retaining strap 23 is then passed through right D-ring 24 and some of the hooks of hook sections 17 on inner surface 44 are engaged with a remaining exposed portion of outer surface 86 of right side bell grip 33 and the exposed portion of outside surface 54 of hoof bell 21 between right side bell grip 33 and toe bell grip 32 thus providing additional anchoring of hoof bell 21 to sole portion 19. Free end 40 of left retaining strap 23 is then drawn tightly through D-ring 24 and laid backwardly along the same path between D-ring 24 and right side bell grip 33 passing free end 40 again through right side loop 26, engaging some of the hooks of hook sections 17 on exposed surface 42 and of left retaining strap 23 with the fabric on end section 28 of exposed surface 42. Since free end 37 of right retaining strap 22 is directed backwardly toward right heel anchoring tab 13 and passed through left side loop 27 and free end 40 of left retaining strap 23 is similarly directed backwardly toward left heel anchoring tab 12 and passed through right side loop 26, free ends 37 and 40 are protected from disengagement thus firmly retaining hoof boot 10 to the hoof thus overcoming one of the objections cited above and in particular with regard to U.S. Pat. Nos. 3,794,119 and 5,224,549 wherein the free end of the hook and loop fastening system is readily opened during forward motions of the hoof. In addition, since free ends 37 and 40 are directed backwardly and substantially protected by side loops 26, 27 there is nothing exposed on the frontal wall or side walls of the hoof which can be caught and opened as shown in the Glass U.S. Pat. Nos. 3,703,209, 3,732,929, 4,174,754, the Glass, et al., U.S. Pat. No. 5,661,958, the Ford design patent D 440,363, the Dallmer U.S. Pat. No. 4,744,422 and the U.S. Pat. No. 6,305,328 to Marquis. Furthermore, the use of mechanical clamps, screws or the like engaging the hoof as shown in the Glass U.S. Pat. Nos. 3,732,929, 4,174,754, 4,189,004, the Glass, et al., U.S. Pat. No. 5,661,958 and the Ford design patent D 440,363 is avoided thus preserving the integrity of the hoof itself. Finally, since only inside surface 55 of hoof bell 21 lies against the hoof, no part of a mechanical fastener, such as shown in U.S. Pat. No. 609,551 or 840,892 or 6,305,328 or 6,694,713, lies against hoof and thus rubbing of any part of a mechanical fastener against the hoof is also avoided.

Hoof bell 21 is preferably cut into crescent 52 from nylon covered neoprene sponge such as used for ankle, knee and arm compression sleeves for athletes, hoof bell 21 having smooth, rounded surface 50 formed from upper end 46 by cutting a plurality of slits 47 inwardly from upper peripheral edge 49, rolling segments 48–48n produced thereby outwardly and securing upper peripheral edge 49 onto outside surface 54. Upper peripheral edge 49 may be secured to outside surface 54 by stitching through segments 48–48n and at least outside surface 54, stitching 57 shown in FIG. 3, however, segments 48–48n may be affixed to outside surface 54 by any means known in the art. Smooth, rounded surface 50 of segments 48–48n removes any source of your irritation to the coronet band or ankle of the animal as no cut edge is presented to the leg of the animal as is prevalent in prior art devices shown in U.S. Pat. Nos. 609,551, 840,892, 6,305,328 or the cut edge of a securing belt shown in U.S. Pat. No. 6,305,328 or 6,694,713. End 53 of hoof bell 21 has hook section 17 of a hook and loop fastening system secured to at least a portion 56 of inside surface 55 thereof, hooks of hook section 17 preferably extending along end 53 from lower peripheral edge 45 to upper end 46. In the preferred embodiment, hook section 17 extends inwardly from end 53 approximately two inches. Hoof bell 21 is preferably a half-moon crescent from about three to about six inches wide at end 53 widening out to a width of from about four to about eight inches in the mid-section 69 thereof and tapering again to a width from about three to about six inches wide at end 67. Hoof bell 21 preferably has a smooth inside surface 55 of a nylon fabric, however inside surface 55 may also be loop material of a hook and loop fastening system or a molded surface of closed cell sponge. Outside surface 54 preferably is pile loop material of a hook and loop fastening system however any material which can be readily gripped to by hooks of hook section 17 may be used to advantage.

Retaining straps 22, 23 are preferably one inch wide square woven heavy nylon webbing material 62 having hook sections 17 applied to inner surfaces 43, 44 and exposed surfaces 38, 42 approximately half the length thereof outwardly from anchoring ends 36, 39 respectively. Pile loop sections 18 are applied to exposed surfaces 38, 42 inwardly approximately half the length of retaining straps 22, 23 from free ends 37, 40, pile loop sections 18 adapted to be hooked to hook sections 17 to secure sole portion 19 and hoof bell 21 to the hoof of an animal such as a horse. Retaining straps 22, 23 are fixed to right heel anchoring tab 13 and left heel anchoring tab 12, respectively, by driving anchoring rivet 70 through anchoring ends 36, 39 thereof and through heel anchoring tab 13, 12, respectively and heading over peening ends 72 of anchoring rivets 70 thus securing retaining straps 22, 23 to sole portion 19. In the preferred embodiment, hook section 17 and loop sections 18 are stitched to the heavy nylon webbing material 62 of retaining straps 22, 23, stitching 57 shown as a dashed line on retaining straps 22, 23 in FIG. 2. Of course, retaining straps 22, 23 may be formed integrally with the sole portion 19 in the same manner as upright sidewalls 14, 25 and toe wall 16, wherein surfaces 38, 42 through 44 have hook sections 17 and loop sections 18 applied thereto in the locations recited above and may be affixed by other, means known in the art.

Grips 32–34 are preferably two inch wide heavy nylon webbing material 63 with hook section 17 of a hook and loop fastening system affixed to the inside surfaces 89, 85 and 88, respectively, hook section 17 extending substantially the entire length thereof. Hook sections 17 are preferably stitched to the heavy nylon webbing material 63 in the same manner as recited above for retaining straps 22, 23. Side loops 26, 27 are preferably one inch wide heavy nylon webbing material 62 which are formed into loops and are affixed to outer surfaces 86, 87 of side bell grips 33, 34, respectively, side loops 26, 27 stitched to the two inch wide heavy nylon webbing material 63 as shown at stitching 57 in FIG. 2. Grips 32–34 are then affixed to upright sidewalls 14, 16, 25 by passing anchoring rivets 70 through one end thereof and further through toe wall 16 and sidewalls 14, 25, respectively, anchoring rivets 70 having peening end 72 peened over against the exposed surface of sidewalls 14, 16 and 25. Heading washer 71 may be placed over peening end 72 prior to peening the peening end 72 thus providing a greater anchoring surface for anchoring rivets 70. Since anchoring rivets 70 are driven through retaining straps 22, 23 and grips 32–34 from the inside of sole portion 19 and flat, smooth heads 73 of anchoring rivets 70 are effectively indented into retaining straps 22, 23 and grips 32–34 during the process of riveting peening end 72, the flat, smooth heads 73 of anchoring rivets 70 may easily be covered by hoof bell 21 thus removing a possible source of irritation and damage to the hoof. Furthermore, as hoof bell 21 is compressible, grips 32–34 are also compressed into outside surface 54 thereof.

Anchoring tabs 15, 115 are also formed from one inch wide heavy nylon webbing material 62, anchoring tabs 15, 115 formed into loops for riveting to toe wall 16. Anchoring tabs 15, 115 have D-rings 11, 24 respectively, placed in the bight formed when anchoring tabs 15, 115 are formed into loops. Anchoring tabs 15, 115 have both ends thereof simultaneously riveted to toe wall 16 with anchoring rivets 70, flat, smooth heads 73 of anchoring rivets 70 preferably disposed through toe bell grip 32, toe wall 16 and anchoring tabs 15, 115. Heading washers 71 are preferably placed over peening ends 72 of anchoring rivets 70 prior to peening over peening end 72. Though anchoring rivets 70 are preferred for anchoring retaining straps 22, 23, side bell grips 33, 34, toe bell grip 32 and anchoring tabs 15, 115 to sole portion 19, other means of anchoring, such as bonding or stitching, these components to sole portion 19 may be utilized without departing from the scope of this invention.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A hoof boot for the hoof of hoofed animals, said hoof boot comprising a ground engaging sole portion, a hoof bell and a means for retaining said hoof boot to said hoof, said hoof bell generally encircling said hoof, said means for retaining associated with said hoof bell wherein said hoof bell is initially separate from said sole portion, said means for retaining is carried by said sole portion and wherein said hoof bell is affixed to said sole portion by said means for retaining and said hoof bell and said sole portion are made fast to said hoof by said means for retaining wherein said means for retaining comprises a means for anchoring, a means for doubling, a means for capturing and right and left retaining straps.

2. A hoof boot as in claim 1 wherein said means for anchoring is associated with right and left heel wall anchoring tabs of said sole portion, said means for anchoring anchoring an end of said right and left retaining straps of said means for retaining to said sole portion.

3. A hoof boot as in claim 1 wherein said means for doubling is associated with right and left toe anchoring tabs carried by said sole portion, said means for doubting returning said right and left retaining straps toward said means for anchoring.

4. A hoof boot as in claim 1 wherein said means for capturing is associated with right and left side bell grips of said sole portion, said means for capturing capturing said left and right retaining straps therein.

5. A hoof boot for the hoof of hoofed animals, said hoof boot comprising a ground engaging sole portion, a hoof bell and a means for retaining said hoof boot to said hoof, said hoof bell generally encircling said hoof, said means for retaining associated with said hoof bell wherein said hoof bell is initially separate from said sole portion, said means for retaining is carried by said sole portion and wherein said hoof bell is affixed to said sole portion by said means for retaining and said hoof bell and said sole portion are made fast to said hoof by said means for retaining wherein said sole portion has right and left heel wall anchoring tabs, right and left walls and a toe wall, said wall anchoring tabs and said walls extending upwardly from an inside surface of said sole portion, said wall anchoring tabs and said walls carrying said means for retaining.

6. A hoof boot as in claim 5 wherein said right heel wall anchoring tab has anchoring end of a right retaining strap anchored thereto, said left heel wall anchoring tab has anchoring end of a left retaining strap anchored thereto, said right retaining strap and said left retaining strap engaging an outside surface of said hoof bell to assist in retaining said hoof bell to said hoof.

7. A hoof boot as in claim 5 wherein said toe wall has a toe bell grip and left and right anchoring tabs affixed thereto, said toe bell grip engaging an outside surface of said hoof bell to retain said hoof bell to said sole portion of said hoof boot and assist in retaining said hoof bell to said hoof.

8. A hoof boot as in claim 7 wherein said right anchoring tab comprises a closed loop and carries a D-ring therein, said left anchoring tab comprises a closed loop and carries a D-ring therein, said D-rings receiving said retaining straps therethrough and returning said retaining straps toward said right and left heel wall anchoring tabs to retain said hoof bell to said hoof.

9. A hoof boot as in claim 5 wherein said right wall has a right side bell grip affixed thereto, said left wall has a left side bell grip affixed thereto, said right side bell grip and said left side bell grip engaging an outside surface of said hoof bell to retain said hoof bell to said sole portion of said hoof boot and assist in retaining said hoof bell to said hoof.

10. A hoof boot for the hoof of hoofed animals, said hoof boot comprising a ground engaging sole portion, a hoof bell and a means for retaining said hoof boot to said hoof, said hoof bell generally encircling said hoof, said means for retaining associated with said hoof bell wherein said hoof bell is initially separate from said sole portion, said means for retaining is carried by said sole portion and wherein said hoof bell is affixed to said sole portion by said means for retaining and said hoof bell and said sole portion are made fast to said hoof by said means for retaining wherein said means for retaining comprises at least one heel tab, toe wall and at least two retaining straps associated with said heel tabs and said toe wall.

11. A hoof boot as in claim 10 wherein said retaining straps have anchoring end thereof anchored to said at least one heel tab.

12. A hoof boot as in claim 11 wherein said toe wall has left and right anchoring tabs rigidly affixed thereto, said anchoring tabs carrying separate D-rings for receiving said retaining straps therethrough and returning a free end of said retaining straps toward said anchoring tabs.

13. A hoof boot as in claim 12 wherein said retaining straps have hooks of a hook and loop fastening system provided on at least one side thereof and said hoof bell has loops of said hook and loop fastening system on an outside surface thereof, said hooks of said retaining straps engaging said loops of said hoof bell to retain said hoof bell in fixed relationship to said sole portion.

14. A hoof boot as in claim 13 wherein said retaining straps have hooks of a hook and loop fastening system provided on an outside surface of said anchoring end thereof and has loops of a hook and loop fastening system on said outside surface of a free end opposite said one end, said loops on said free end engaged by said hooks on said anchoring end when said free end is returned to said anchoring end.

15. A hoof boot as in claim 14 wherein said side walls have side bell grips anchored thereto, said side bell grips having hooks of a hook and loop fastening system disposed on an inside surface thereof, said hooks engaging an outside surface of said hoof bell to fix said hoof bell to said sole portion.

16. A hoof boot as in claim 15 wherein said side bell grips have loops of webbing affixed to an outside surface thereof, said loops receiving said retaining straps therethrough.

17. A hoof boot as in claim 16 wherein said retaining straps are anchored to said heel wall anchoring tabs, said side bell grips are anchored to said sidewalls, said anchoring tabs are anchored to said toe wall with anchoring rivets.

18. A riding hoof boot for a hoof of a riding animal, said hoof boot comprising a sole portion, a hoof bell and means for retaining said sole portion and said hoof bell upon a hoof of said animal, said sole portion further comprising an inwardly inclined toe wall, substantially upright right and left walls and substantially upright right and left heel wall anchoring tabs, said walls and said tabs extending upwardly from an inside surface of an outer periphery of said sole portion wherein said hoof bell has a lower peripheral edge thereof disposed inwardly of said wall of said sole portion, said means for retaining comprising means fbr anchoring associated with said right and left heel wall anchoring tabs, means for removably affixing associated with said right and left toe wall tabs, means for capturing associated with said right and left side walls and separate left and right retaining straps, said left retaining strap having anchoring end thereof attached to said right heel tab, said left retaining strap passing through said left side wall loop, through said means for removably affixing associated with said right toe wall tab, again through said left side wall loop, said left retaining strap having a free end releasably affixed to said left retaining strap adjacent said right heel wall anchoring tab, and wherein said right retaining strap having anchoring end thereof attached to said left heel tab, said right retaining strap passing through said right side wall loop, through said means for removably affixing associated with said left toe wall tab, again through said right side wall loop, said right retaining strap having a free end thereof releasably affixed to said right retaining strap adjacent said left heel wall anchoring tab.

19. A comfort boot for the hoof of hoofed animals, said comfort boot comprising a sole portion, a hoof bell and means for retaining said sole and said hoof bell upon a hoof of said hoofed animal, said sole portion further comprising an inwardly inclined toe wall tab, substantially upright right and left walls and substantially upright right and left heel wall anchoring tabs, said walls extending upwardly from an inside surface of an outer periphery of said sole portion wherein said hoof bell has a lower peripheral edge thereof disposed inwardly of said wall of said sole portion, said means for retaining comprising means for anchoring associated with said right and left heel wall anchoring tabs, means for removably affixing associated with said right and left toe wall tabs, means for capturing associated with said right and left side wall and separate left and right retaining straps, said left retaining strap having anchoring end thereof attached to said right heel tab, said left retaining strap passing through said left side wall loop, through said means for removably affixing associated with said right toe wall tab, again through said left side wall loop, said left retaining strap having a free end releasably affixed to said left retaining strap adjacent said right heel wall anchoring tab, and wherein said right retaining strap having anchoring end thereof attached to said left heel tab, said right retaining strap passing through said right side wall loop, through said means for removably affixing associated with said left toe wall tab, again through said right side wall loop, said right retaining strap having a free end thereof releasably affixed to said right retaining strap adjacent said left heel wall anchoring tab.

* * * * *